(12) United States Patent
Wu

(10) Patent No.: US 12,736,121 B2
(45) Date of Patent: Sep. 15, 2026

(54) GEAR

(71) Applicant: SEW-EURODRIVE GMBH & CO. KG, Bruchsal (DE)

(72) Inventor: Zili Wu, Tianjin (CN)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 38 days.

(21) Appl. No.: 18/684,967

(22) PCT Filed: Jul. 18, 2022

(86) PCT No.: PCT/EP2022/025333
§ 371 (c)(1),
(2) Date: Feb. 20, 2024

(87) PCT Pub. No.: WO2023/020711
PCT Pub. Date: Feb. 23, 2023

(65) Prior Publication Data

US 2024/0344602 A1 Oct. 17, 2024

(30) Foreign Application Priority Data

Aug. 20, 2021 (CN) ......................... 202110960963.6
Sep. 30, 2021 (DE) ......................... 102021004915.2

(51) Int. Cl.
*F16H 55/10* (2006.01)
*F16H 55/12* (2006.01)
*F16H 55/17* (2006.01)

(52) U.S. Cl.
CPC ............. *F16H 55/12* (2013.01); *F16H 55/17* (2013.01)

(58) Field of Classification Search
CPC ................................. F16H 55/12; F16H 55/17
See application file for complete search history.

(56) References Cited

U.S. PATENT DOCUMENTS 3,742,779 A * 7/1973 Shaver .................... F16H 55/12 241/176
10,221,932 B2 3/2019 Wu
(Continued)

FOREIGN PATENT DOCUMENTS

CN 103867650 B 4/2016
CN 106812911 B 6/2021
(Continued)

OTHER PUBLICATIONS

International Search Report issued in corresponding International Application No. PCT/EP2022/025333 dated Oct. 12, 2022, pp. 1-2, English Translation.

(Continued)

*Primary Examiner* — Zakaria Elahmadi
(74) *Attorney, Agent, or Firm* — Carter, DeLuca & Farrell LLP

(57) ABSTRACT

A gear is composed of segments, and each segment includes a support region, a first flange region which is arranged at the front in the circumferential direction, and a second flange region which is arranged at the rear in the circumferential direction. A first surface region of the first flange region of each segment lies against the second surface region of the second flange region of the next adjacent segment to the respective segment, and at least one screw which passes through the first flange region of the respective segment and the flange region of the respective next adjacent segment connects the segments. A toothing is introduced into the support region of the segment, and the toothing is arranged as helical toothing. The first surface region extends parallel to the tooth, which is next adjacent to the surface region, of the toothing of the respective segment.

29 Claims, 6 Drawing Sheets

(56) References Cited

U.S. PATENT DOCUMENTS

| | | | | |
|---|---|---|---|---|
| 11,402,008 | B2 | 8/2022 | Wu | |
| 2018/0283521 | A1* | 10/2018 | Wu | F16H 55/12 |

FOREIGN PATENT DOCUMENTS

| | | | | |
|---|---|---|---|---|
| DE | 370560 | C | 3/1923 | |
| DE | 102008054189 | A1 | 7/2010 | |
| DE | 102016010084 | A1 * | 4/2017 | F16H 55/12 |
| EP | 3643947 | A1 * | 4/2020 | F16H 55/17 |
| WO | 2013020639 | A1 | 2/2013 | |

OTHER PUBLICATIONS

International Report on Patentability issued in corresponding International Application No. PCT/EP2022/025333, dated Feb. 13, 2024, pp. 1-9, English Translation.

European Office Action issued by the European Patent Office on Feb. 10, 2026 in corresponding EP Patent Application No. 22750761.3, with English Translation.

* cited by examiner

GEAR

A gear composed of segments which has helical toothing is described in PCT Patent Document No. WO 2013/020639. As illustrated in FIGS. 3 and 4 thereof, the outermost tooth of the segment in the circumferential direction is not flush with the connecting surface with the reference number 42, but protrudes. Screws pass through the connecting surface.

FIELD OF THE INVENTION

The invention relates to a gear, in particular a gear rim.

BACKGROUND INFORMATION

A drum drive and an annular segment are described in German Patent Document No. 10 2008 054 189.

A gear with helical toothing is described in German Patent Document No. 10 2016 010 084.

A divided gear is described in German Patent Document No. 370560.

SUMMARY

Example embodiments of the present invention provide a gear, which has a long service life.

According to example embodiments, a gear, e.g., a gear rim, is formed of segments arranged one behind the other in the circumferential direction in relation to the axis of rotation of the gear. Each segment includes a support region, a first flange region which is arranged at the front in the circumferential direction, and a second flange region which is arranged at the rear in the circumferential direction. A first surface region of the first flange region of each segment lies against the second surface region of the second flange region of the next adjacent segment to the respective segment, and at least one screw which passes through the first flange region of the respective segment and the flange region of the respective next adjacent segment connects the segments. A toothing is introduced into the support region of the segment, and the toothing is arranged as a helical toothing, e.g., having a non-vanishing helix angle, having a helix angle different from zero, etc. The screw protrudes through the first surface region, and the first surface region extends parallel to the tooth, which is next adjacent to the surface region, of the toothing of the respective segment. Additionally or alternatively, the first surface region extends parallel to the tooth of the toothing of the respective segment, which tooth is adjacent to the first surface region. For example, the surface region is flush with the tooth, so that the tooth does not protrude beyond the first surface region or is retracted in the circumferential direction.

Thus, mechanical stresses are less able to build up. This is because the transition from the toothing to the surface region is provided without any protrusion or recess. This means that the surface region is flush with the toothing and the tension forces are distributed as evenly as possible. In addition, the service life is increased or, for example, a higher torque can be transmitted.

According to example embodiments, the segment has a blade region and struts, and the support region and the blade region are connected via the struts and also via the first flange region. For example, the first flange region is located radially between the support region and the blade region. For example, the first flange region is arranged at the front end region of the segment in the circumferential direction. Thus, a high degree of stability can be achieved with a low amount of material, a high torque can be transmitted with a low amount of material, and a long service life can be achieved.

In contrast to conventional arrangements, the screw protrudes through the first surface region. This surface region is configured to extend in the direction of the incline. Thus, a flush connection of the next adjacent tooth to the first surface region is possible along the entire axial extension of the tooth.

According to example embodiments, the support region and the blade region are also connected via the second flange region. For example, the second flange region is located radially between the support region and the blade region. For example, the second flange region is arranged at the rear end region of the segment in the circumferential direction. Thus, the segment is rigid, and a high torque can be transmitted with a low amount of material.

According to example embodiments, the struts are spaced apart from one another in the circumferential direction via cutouts extending through in the axial direction. For example, the cutouts each have a clear width measured in the circumferential direction which increases with increasing radial distance, e.g., in a radial distance range which exceeds at least 70% of the radial distance range covered by the cutouts in total. Thus, high stability can be achieved with a low amount of material.

For example, the axial direction is aligned parallel to the direction of the axis of rotation of the gear.

According to example embodiments, the support region, the blade region, the first flange region, the second flange region, and the struts are made in one piece, e.g., one part, so the segment is, for example, made from one piece of steel. Thus, the segment can be produced as a cast part, on which the toothing and surface regions can be finely machined.

According to example embodiments, the segment is made of ADI, e.g., of a bainitic cast iron with nodular graphite, a heat-treated ductile spheroidal graphite cast iron, etc. Thus, while a great deal of manufacturing effort is required, a high load capacity can be achieved and thus a high torque can be transmitted.

According to example embodiments, the first and/or second surface region is arranged to be flat and/or substantially essentially flat. Thus, the contact surface of the two segments is sufficiently large so that the two segments to be joined can be pressed together with high contact pressure.

According to example embodiments, the normal direction of the first surface region has the helix angle to the tangential direction which belongs to the first surface region. Thus, the surface region extends parallel to the toothing. Thus, the tooth root opens directly over its entire axial length into the flat surface region. In this manner, any protrusion or recess is avoided and thus the build-up of mechanical stresses is kept low.

According to example embodiments, a first stepped bore is introduced into the first surface region, through which stepped bore the screw protrudes. For example, the bore axis of the first stepped bore is not aligned parallel to the normal direction of the first surface region and/or has the helix angle to the normal direction of the first surface region. Thus, the stepped bore is readily produced, and the screw can be protected from shear forces of the segments by the region expanded in front of the first step, i.e., the annular gap. By introducing forces further away, a lower shear force can be built up within the screw.

According to example embodiments, the minimum distance between the step of the first stepped bore and the first surface region is variable in the circumferential direction around the bore axis of the first stepped bore, e.g., depending on the associated circumferential angle around the bore axis. Thus, the stepped bore is aligned to the normal direction inclined by the helix angle. Thus, although the stepped bore is aligned in a tangential direction, the flange region is arranged parallel to the toothing. On the one hand, a long service life is achieved in this manner, as there is no protrusion or the like and the mechanical stresses are thus reduced and run smoothly. On the other hand, the screws are aligned in the tangential direction, i.e., in the tangential direction perpendicular to the radial direction of the gear at the contact surface.

According to example embodiments, the clear internal diameter of the first stepped bore increases monotonically with increasing distance from the first surface region. Thus, in the region of contact between the two flange regions of the connected segments, an annular gap protects the screw from excessive shear forces. In this manner, the shear forces can be redirected, thus reducing the load on the screw and increasing the service life.

According to example embodiments, a second stepped bore is introduced into the second surface region, through which stepped bore the screw protrudes. Thus, a tangentially directed stepped bore is also introduced into the surface region of the other segment, which surface region is inclined by the helix angle relative to a radial surface.

According to example embodiments, the bore axis of the second stepped bore is not aligned parallel to the normal direction of the first surface region and/or has the angular amount of the helix angle to the normal direction of the first surface region. Thus, the service life is increased since any protrusion of the toothing is avoided.

According to example embodiments, the minimum distance between the step of the second stepped bore and the second surface region is variable in the circumferential direction around the bore axis of the second stepped bore, e.g., depending on the associated circumferential angle around the bore axis. Thus, the screws are arranged in the tangential direction and the surface region is arranged inclined by the helix angle. Thus, any protrusion of the toothing is avoided and the service life is increased.

According to example embodiments, the clear internal diameter of the second stepped bore increases monotonically with increasing distance from the second surface region. Thus, an annular gap protecting the screw surrounds the screw in the region of contact of the two flange regions.

According to example embodiments, a threaded nut is screwed onto a threaded region of the screw so that the flange regions of the respective segment and the next adjacent segment are pressed together between the nut and the screw head of the screw. Thus, the segments can be connected in a simple and cost-effective manner.

According to example embodiments, an annular gap surrounds the screw in a region seen in the direction of the screw axis, which region is arranged between the region of contact of the screw with the first flange region and is arranged between the region of contact of the screw with the second flange region. Thus, the screw is protected from excessive shear forces, and the service life is increased.

According to example embodiments, the annular gap includes the region covered by the region of contact between the first and second surface regions in the screw axis direction. Thus, the screw is protected from excessive shear forces, and the service life is increased.

According to example embodiments, the first flange region has a cutout which extends through in the circumferential direction and whose clear diameter, largest inside diameter, and/or clear opening region decreases monotonically in the circumferential direction with increasing distance from the first surface region. Thus, to connect the segments, a nut on the one hand and a screw head of the screw on the other hand presses on the flange region, specifically on the side of the narrowed region of the cutout. The cutout is widened towards the region of contact. This is because there, a sufficiently large surface region acts as a region of contact. Thus, the surface pressure is kept sufficiently low. However, the pressing of the nut and the screw head takes place in a very small surface region. In addition, there is not just one screw, but a plurality of corresponding screws, thus exerting a high level of pressure. However, as the cutout is narrowed there, sufficient material is available for absorbing the high pressing forces. However, the widening of the cutout towards the region of contact also saves material and thus weight.

According to example embodiments, the second flange region has a cutout which extends through in the circumferential direction and whose clear diameter, largest inside diameter, and/or clear opening region decreases monotonically counter to the circumferential direction with increasing distance from the second surface region. Thus, to connect the segments, a nut on the one hand and a screw head of the screw on the other hand presses on the flange region on the side of the narrowed region of the cutout. The cutout is widened towards the region of contact. This is because there, a sufficiently large surface region acts as a region of contact. Thus, the surface pressure is kept sufficiently low. However, the pressing of the nut and the screw head takes place in a very small surface region. In addition, there is not just one screw, but a plurality of corresponding screws, thus exerting a high level of pressure. However, as the cutout is narrowed there, sufficient material is available for absorbing the high pressing forces. However, the widening of the cutout towards the region of contact also saves material and thus weight.

Further features and aspects of example embodiments of the present invention are described in more detail below with reference to the appended schematic Figures.

DETAILED DESCRIPTION

Figure 1:
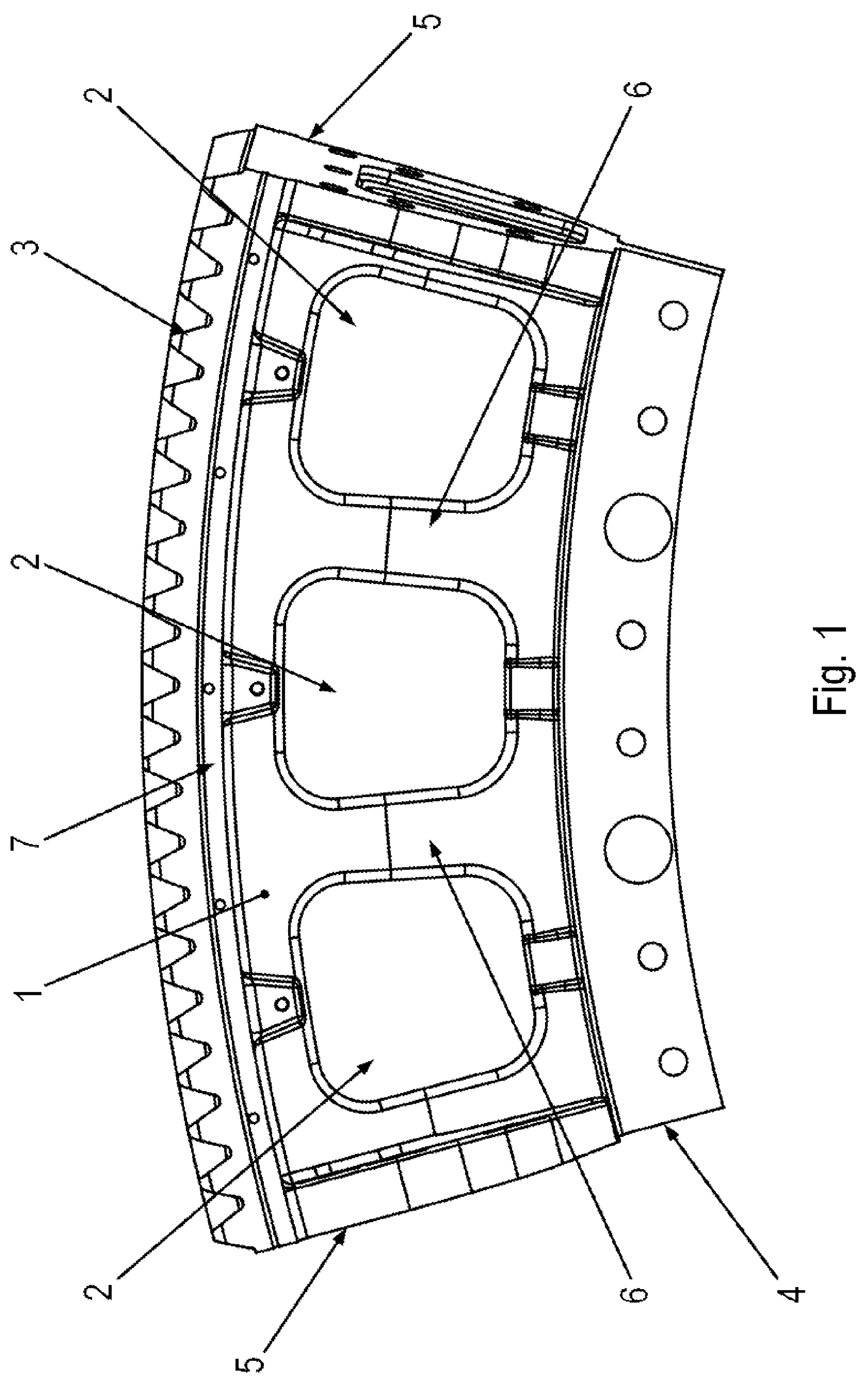
FIG. 1 illustrates one of the segment 1 from which a gear, e.g., a gear rim, is composed.
Figure 2:
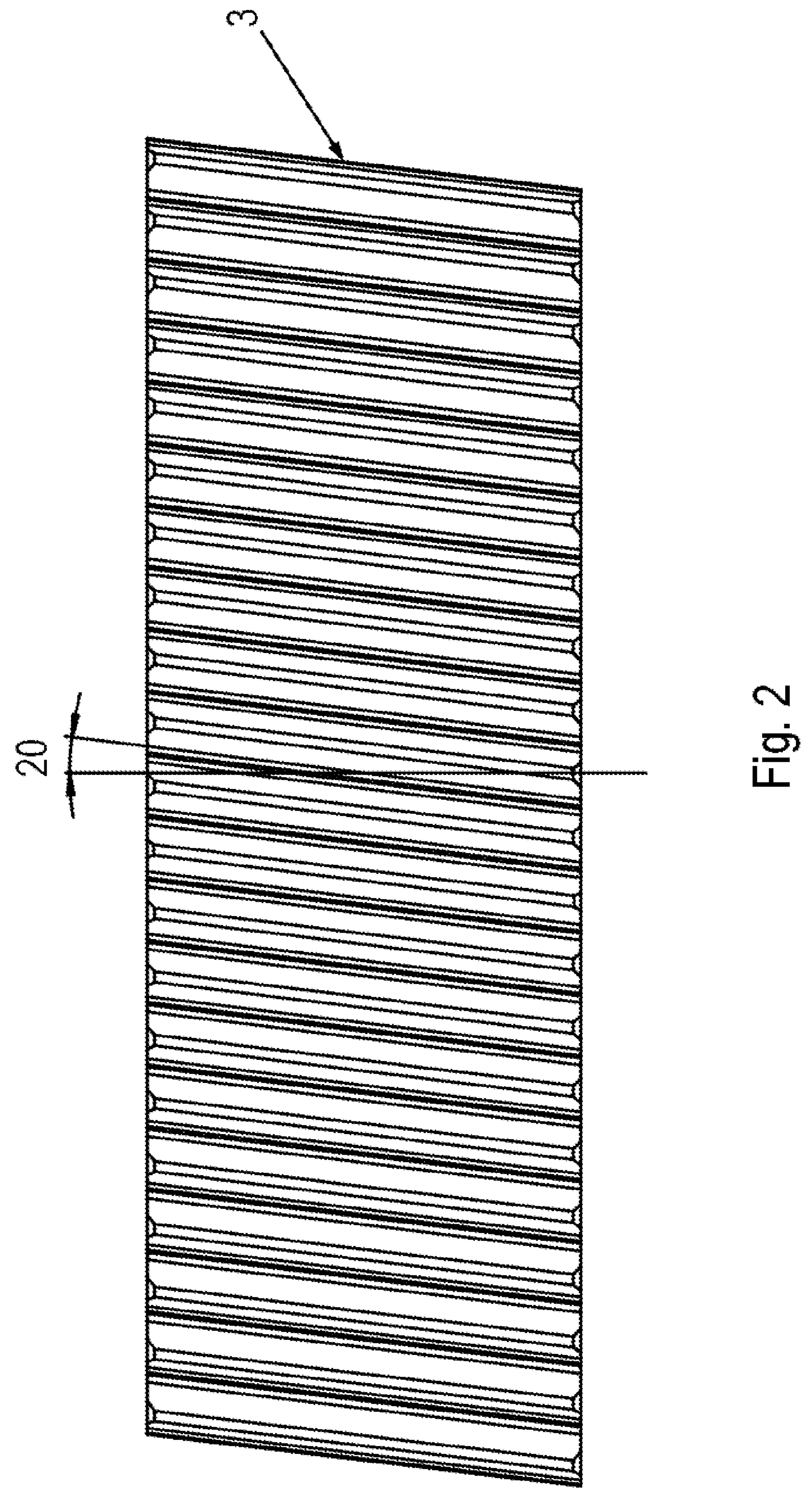
FIG. 2 is a top view of the segment 1, e.g., from a radial direction.
Figure 3:
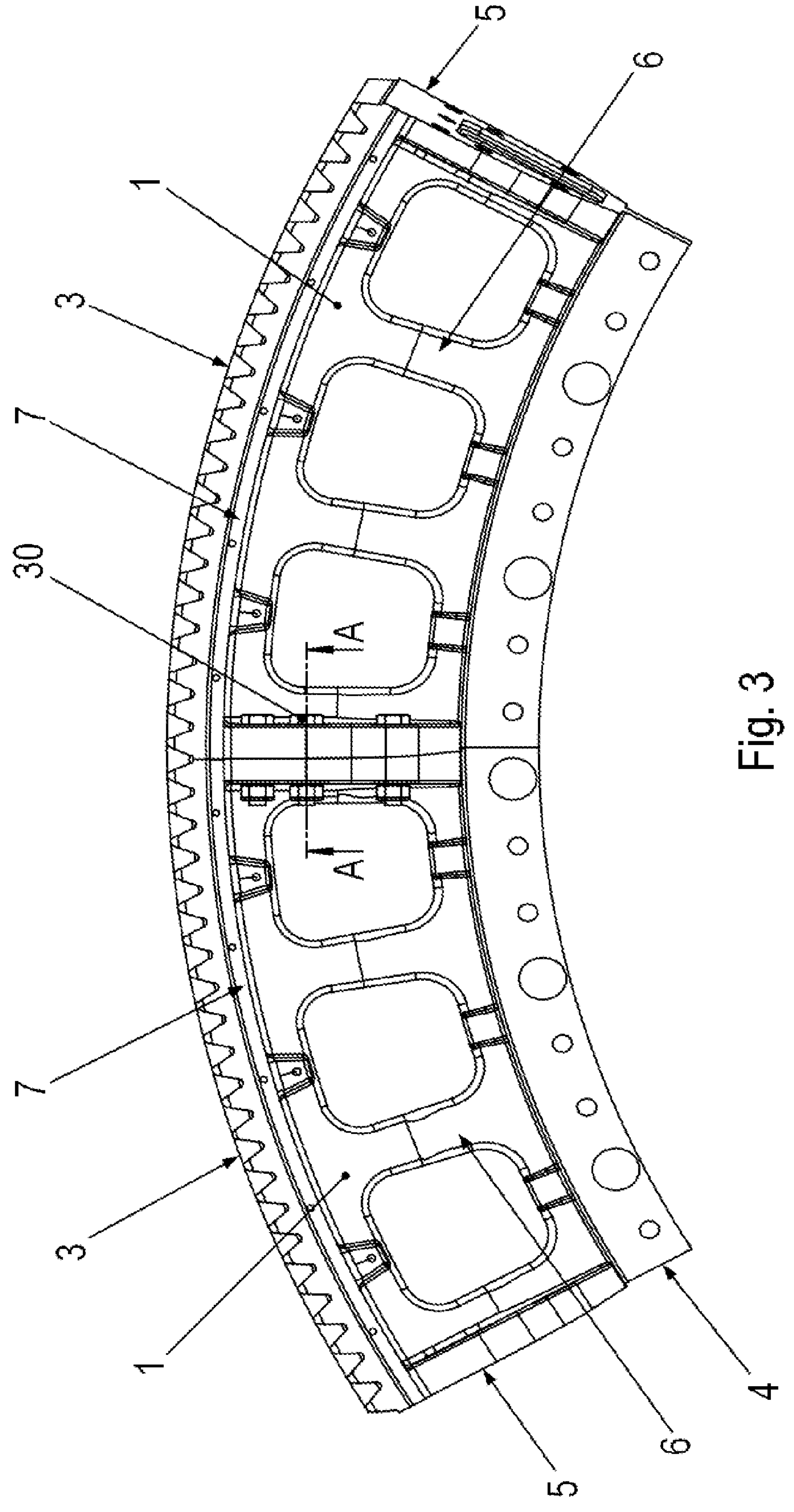
FIG. 3 is a side view of two of the segments 1 connected by screws 30.

As illustrated in the Figures, a respective segment 1 has a blade region 4 with which the segment is fastened to a drum via screws, e.g., a cement drum, to be driven by the gear, e.g., the gear rim. Alternatively, a welded connection can also be implemented. The blade region 4 protrudes between two annular regions of the drum and is connected to these ring regions by welding. In the configuration with screws, the screws are each guided in an axial direction through the annular regions and also the blade region 4.

As illustrated in the Figures, on the radially outer circumference of the segment 1 of the gear, the toothing 3 is introduced into a support region 7.

The toothing 3 is arranged as helical toothing with a helix angle 20.

The support region 7 is connected via struts 6 arranged radially between the blade region 4 and the support region 7. The struts are spaced apart from one another in the circumferential direction via cutouts 2 extending through in the axial direction.

The axial direction is parallel to the direction of the axis of rotation of the gear.

Each of the cutouts 2 is increasingly extended further in the circumferential direction with increasing radial distance from the axis of rotation of the gear.

In addition, the support region 7 and the blade region 4 are also connected via a first flange region 5, which, e.g., is located radially between the support region 7 and the blade region 4. The first flange region 5 is arranged at the front end region of the segment 1 in the circumferential direction.

In addition, the support region 7 and the blade region 4 are also connected via a second flange region 5, which, e.g., is located radially between the support region 7 and the blade region 4. The second flange region 5 is arranged at the rear end region of the segment 1 in the circumferential direction.

The, e.g., finely machined, e.g., ground, front and rear end face of the segment is in each case a surface region of the first or, respectively, second flange 5. These surface regions serve to connect the next adjacent segments 1. Thus, the flanges 5 of two adjacent, connected segments 1, which flanges 5 are in contact with each other, can be precisely aligned with each other. The surface regions thus act as alignment surfaces and/or centering surfaces.

The surface regions are, for example, arranged as flat surfaces.

These surface regions are aligned parallel to the tooth root curve of the tooth, which is next adjacent to flange 5, of segment 1. Since the toothing is arranged as a helical toothing, the surface region is also provided with a helix angle to a plane which contains the axis of rotation of the gear and, e.g., tangentially, lies against the tooth root curve at one point of the tooth root curve.

In this context, the tooth root refers to the surface point of a tooth of the toothing 3, which surface point lies on the root circle of the toothing, e.g., at an axial position. The tooth root thus has the distance of the root circle radius to the axis of rotation of the gear.

In this context, the tooth root curve refers to the line formed by the tooth roots of all axial positions.

Since the surface regions of the respective flange region 5 extend parallel to the adjoining tooth of the toothing, e.g., the tooth next adjacent to the surface region, the surface region is flush with the tooth so that the tooth does not protrude or is retracted in the circumferential direction. For example, smooth tension curves can thus be achieved and predetermined breaking points can be avoided.

The axial width of the flange regions 5 is greater than the axial width of the blade region 4.

Figure 4:
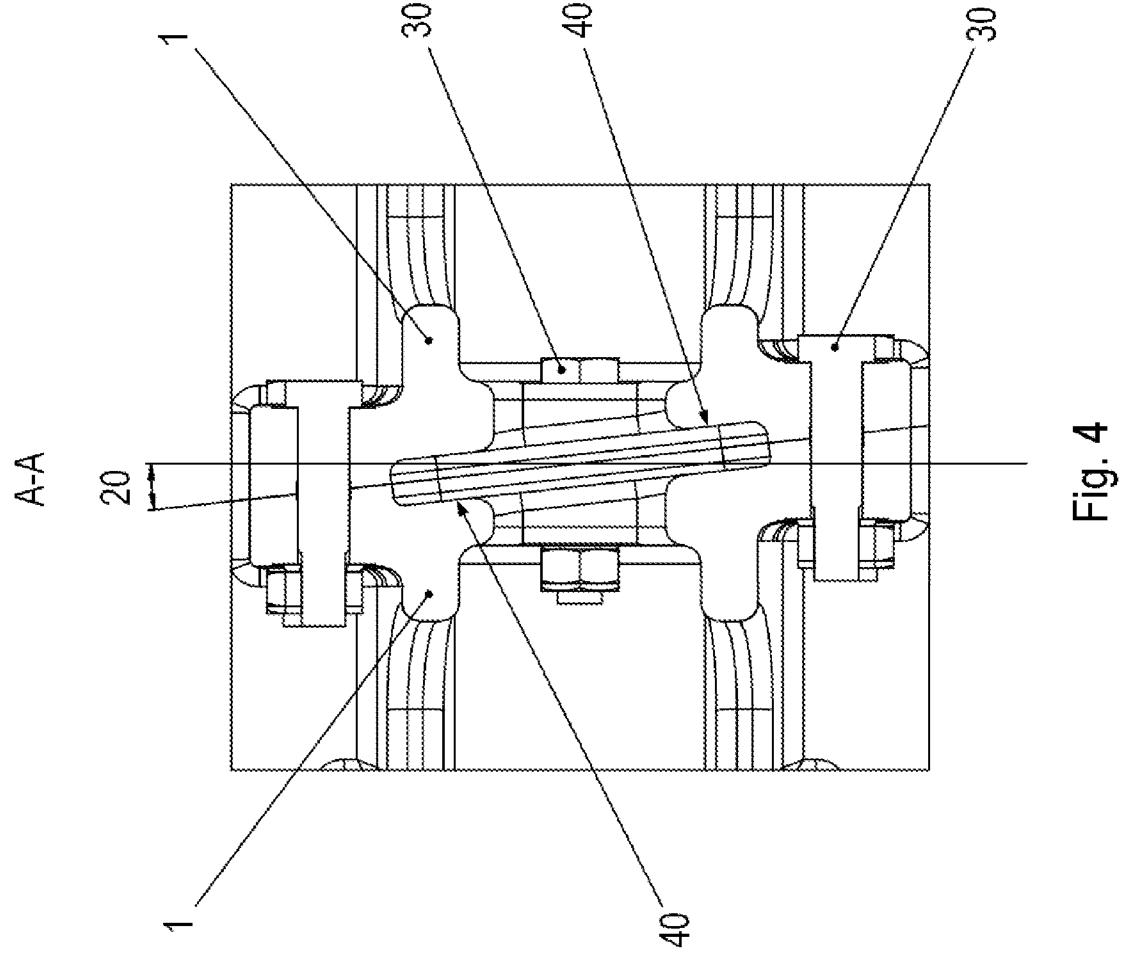
FIG. 4 is a cross-sectional view of the connection region of the two segments 1.
Figure 5:
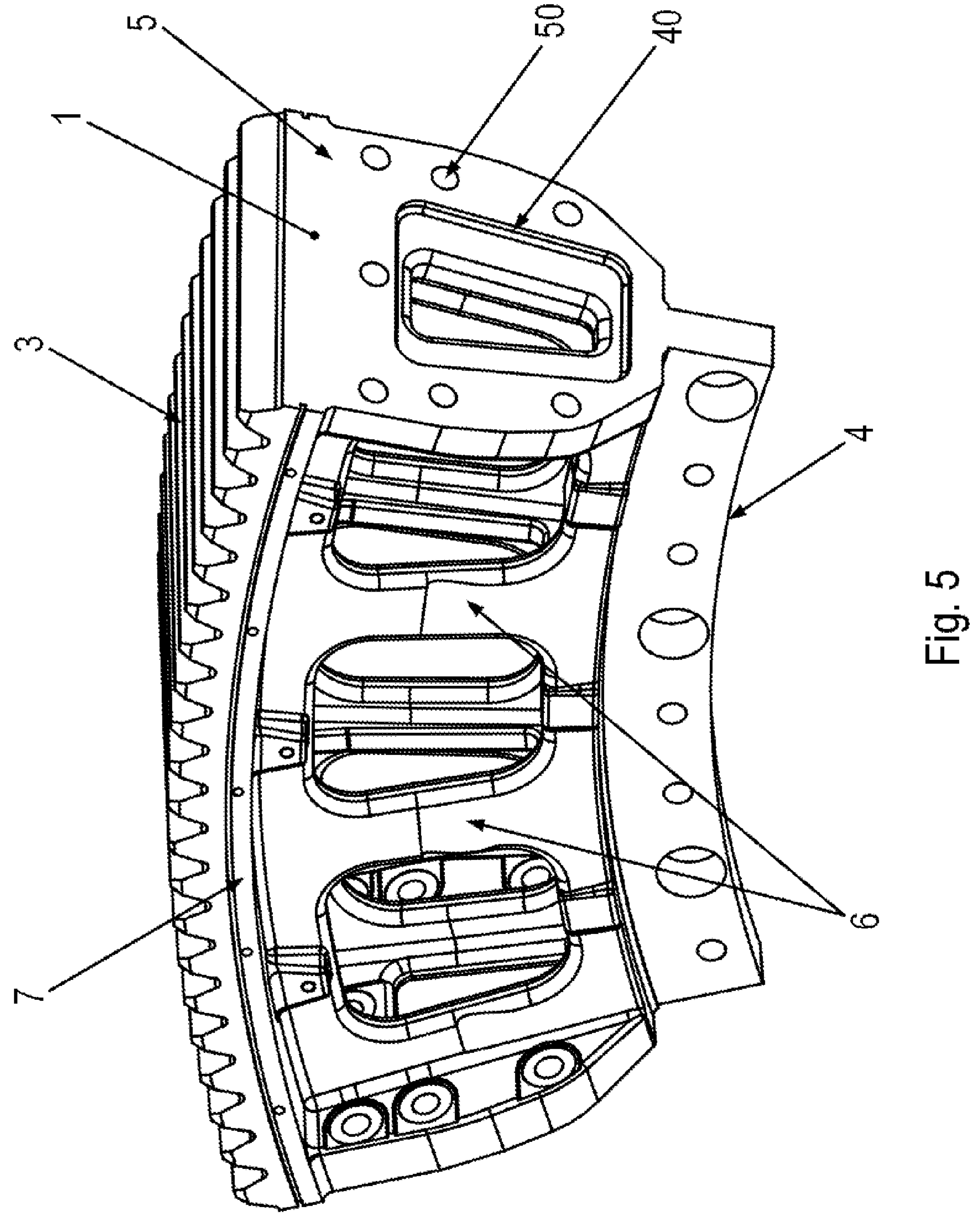
FIG. 5 is a perspective view of the segment 1.
Figure 6:
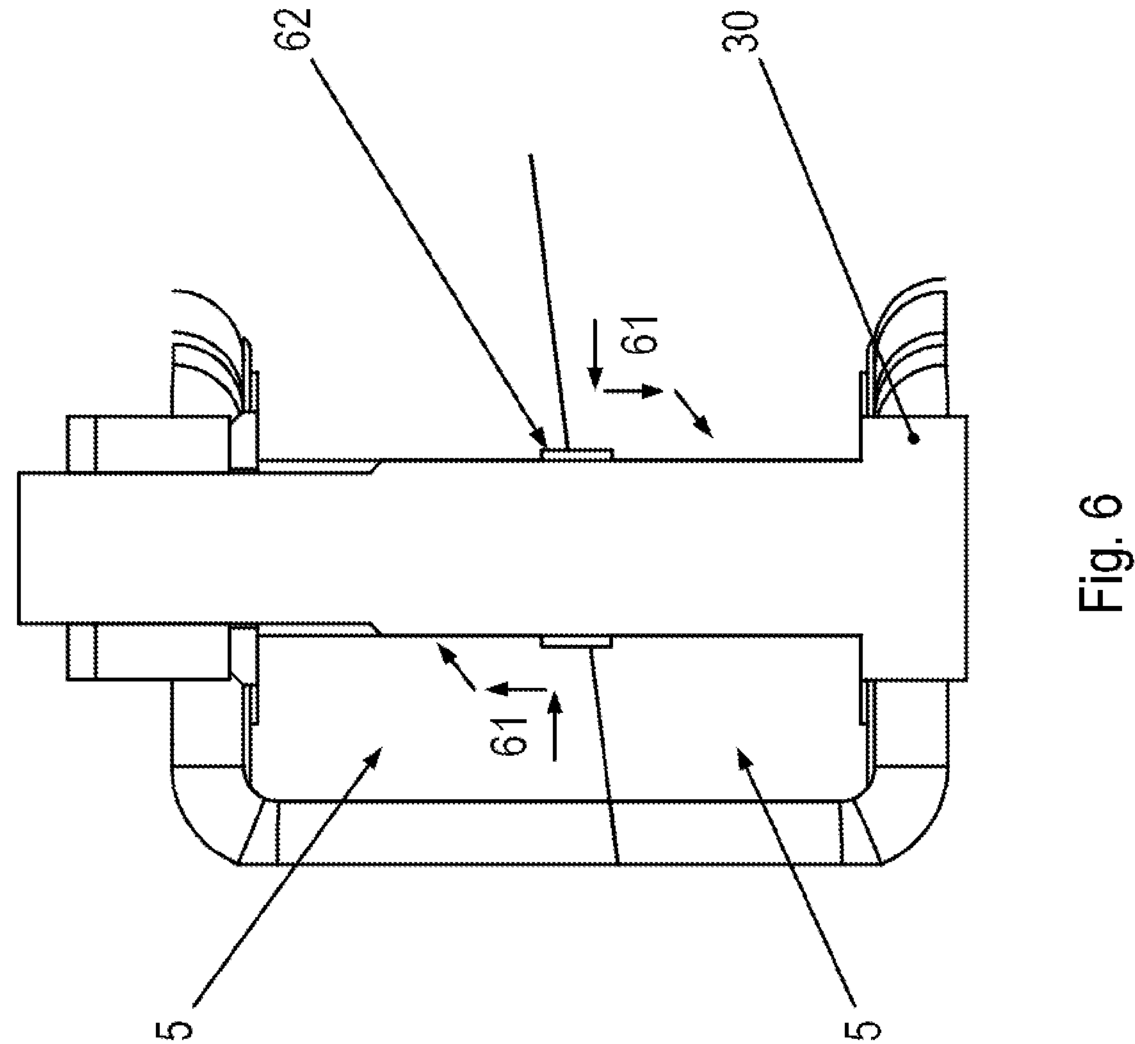
In FIG. 6, the connection region of the two segments 1 around one of the screws 30 is schematically illustrated, e.g., so that FIG. 6 corresponds to an enlarged section of FIG. 4.

As illustrated in FIG. 4 and FIG. 6, the respective screw 30 protrudes through the flange regions 5 of the segments 1 next adjacent to each other, which flange regions 5 are in contact with and lying against each other. For this purpose, the screw 30 is arranged cylindrically in a region arranged between the screw head of the screw 30 and a threaded region of the screw 30. The screw 30 lies with the cylindrical region against the bore hole of the flange region 5 through which the screw 30 protrudes.

In this manner, the two segments can be centered relative to each other.

A nut is screwed onto the threaded region of the screw 30 so that the nut and the screw head press the two flange regions 5 together.

However, in the plane receiving the contact surface of the segments 1, the bore holes are wider, and, e.g., have a step.

This widening of the bore holes creates an annular gap 62 which winds around the screw 30.

Shear forces 61 acting in the contact plane are thus deflected and the screw 30 is protected from peak tension curves. In this manner, the service life, e.g., of the screw and the connection of the two segments 1 effected by the screw, is increased.

The two bore holes, which are aligned with each other, are each arranged as stepped bores in the respective flange region 5, and the two bore holes lie against each other with their wider clear inside diameter.

The two bore holes are introduced into the respective surface region. Thus, the bore axis is not parallel to the normal direction of the respective surface region. However, the normal directions of the two surface regions are aligned parallel to each other.

The step of the respective bore hole therefore has a non-constant and/or variable distance to the flat surface region. The distance of the step from the flat surface region depends on the circumferential angle in the circumferential direction around the bore axis.

The clear inside diameter of the respective bore hole decreases monotonically with increasing distance from the respective other segment 1 or bore hole, e.g., it decreases monotonically with increasing distance from the surface region of the flange region 5.

The threaded region of the screw 30 protrudes from the flange region 5, so that a threaded nut is screwed onto the threaded area.

Since the screw 30 in each case lies against the narrower region of the bores, e.g., with a precise fit, the segments 1 are centered in relation to each other.

According to example embodiments, instead of the bore holes being arranged as stepped bore holes for holding the screw 30, a non-stepped, i.e., non-jumping or less jumping curve of the clear internal diameter of the respective bore hole is implemented. In this manner, the shear forces do not act directly starting from the step, but build up slowly with increasing distance from the surface region. In this manner, the screw 30 is less exposed to variable tension curves and the screw 30 thus has an increased service life.

For example, with increasing distance from the respective surface region, the clear inside diameter is a decreasing, smooth, and/or continuously differentiable function following the region of contact between the screw 30 and the bore hole, e.g., the flange region 5.

LIST OF REFERENCE NUMERALS

1 Segment
2 Cutout
3 Toothing
4 Blade region
5 Flange region
6 Strut
7 Support region
20 Helix angle
30 Screw
40 Window opening, e.g., stepped window opening
50 Bore hole

60 Contact surface
61 Shear force
62 Annular gap

The invention claimed is:

1. A gear, comprising:

a plurality of segments arranged one behind another in a circumferential direction relative to an axis of rotation of the gear, each segment including a support region, a first flange region arranged at a front in the circumferential direction, and a second flange region arranged at a rear in the circumferential direction;

wherein a first surface region of the first flange region of each segment lies against a second surface region of the second flange region of a next adjacent segment;

wherein at least one screw passes through and connects the first flange region of each segment and the second flange region of the next adjacent segment;

wherein the support region of each segment includes a helical toothing wherein the screw protrudes through the first surface region;

wherein the first surface region extends parallel to a tooth of the toothing that is adjacent to the first surface region;

wherein a first stepped bore is arranged the first surface region, the screw protruding through the stepped bore; and wherein a clear internal diameter of the first stepped bore increases monotonically with increasing distance from the first surface region.

2. The gear according to claim 1, wherein the gear is arranged as a gear rim.

3. The gear according to claim 1, wherein the surface region is flush with the tooth so that the tooth does not protrude beyond the first surface region and/or is recessed in the circumferential direction.

4. The gear according to claim 1, wherein the segment includes a blade region and struts, and the support region and the blade region are connected via the struts and also via the first flange region.

5. The gear according to claim 4, wherein the first flange region is located radially between the support region and the blade region.

6. The gear according to claim 4, wherein the first flange region is arranged at a front end region of the segment in the circumferential direction.

7. The gear according to claim 4, wherein the support region and the blade region are connected via the second flange region.

8. The gear according to claim 7, wherein the second flange region is located radially between the support region and the blade region.

9. The gear according to claim 7, wherein the second flange region is arranged at a rear end region of the segment in the circumferential direction.

10. The gear according to claim 4, wherein the struts are spaced apart from one another in the circumferential direction by cutouts extending through in the axial direction.

11. The gear according to claim 10, wherein each cutout has a clear width measured in the circumferential direction that increases with increasing radial distance.

12. The gear according to claim 10, wherein each cutout has a clear width measured in the circumferential direction that increases with increasing radial distance in a radial distance range that exceeds at least 70% of a radial distance range covered by the cutouts in total.

13. The gear according to claim 1, wherein an axial direction of the gear is aligned parallel to a direction of the axis of rotation of the gear.

14. The gear according to claim 4, wherein the support region, the blade region, the first flange region, the second flange region, and the struts are integral.

15. The gear according to claim 14, wherein the segment is formed of one piece of steel.

16. The gear according to claim 1, wherein the segment is made of ADI, a bainitic cast iron with nodular graphite, and/or a heat-treated ductile spheroidal graphite cast iron.

17. The gear according to claim 1, wherein the first and/or second surface region is flat and/or is substantially flat.

18. The gear according to claim 1, wherein a normal direction of the first surface region has a helix angle to a tangential direction that belongs to the first surface region and/or the first surface region is aligned parallel to the first flange region.

19. The gear according to claim 1, wherein a bore axis of the first stepped bore is not aligned parallel to a normal direction of the first surface region and/or has a helix angle to the normal direction of the first surface region.

20. The gear according to claim 1, wherein a minimum distance between a step of the first stepped bore and the first surface region is variable in the circumferential direction around a bore axis of the first stepped bore.

21. The gear according to claim 1, wherein a second stepped bore is arranged in the second surface region, the screw protruding through the second stepped bore.

22. The gear according to claim 21, wherein a bore axis of the second stepped bore is not aligned parallel to a normal direction of the first surface region and/or has an angular amount of a helix angle to the normal direction of the first surface region.

23. The gear according to claim 21, wherein a minimum distance between a step of the second stepped bore and the second surface region is variable in the circumferential direction around a bore axis of the second stepped bore.

24. The gear according to claim 21, wherein a clear internal diameter of the second stepped bore increases monotonically with increasing distance from the second surface region.

25. The gear according to claim 1, wherein a threaded nut is screwed onto a threaded region of the screw to press together the first flange region of each segment and the second flange region of the next adjacent segment between the nut and a screw head of the screw.

26. The gear according to claim 1, wherein an annular gap surrounds the screw in a region (a) arranged between a region of contact of the screw with the first flange region and arranged between a region of contact of the screw with the second flange region and/or (b) that includes a region covered by the region of contact between the first and second surface regions in a screw axis direction.

27. The gear according to claim 1, the first flange region includes a cutout that extends through in the circumferential direction and that has a clear diameter, a largest inside diameter, and/or a clear opening region that decreases monotonically in the circumferential direction with increasing distance from the first surface region, and/or the second flange region includes a cutout that extends through in the circumferential direction and that has a clear diameter, a largest inside diameter, and/or a clear opening region that decreases monotonically counter to the circumferential direction with increasing distance from the second surface region.

28. The gear according to claim 1, wherein with increasing distance from the first surface region, a clear inside diameter of the first stepped bore is arranged according to a decreasing, smooth, and/or continuously differentiable function following a region of contact between the screw and a wall of the stepped bore.

29. The gear according to claim 1, wherein the surface region is flush with the tooth so that the tooth does not protrude beyond the first surface region.

* * * * *